United States Patent
Miyamoto et al.

(10) Patent No.: US 11,614,826 B2
(45) Date of Patent: Mar. 28, 2023

(54) METHOD OF PALM REJECTION AND SENSOR CONTROLLER

(71) Applicant: Wacom Co., Ltd., Saitama (JP)

(72) Inventors: Masayuki Miyamoto, Saitama (JP); Hideyuki Hara, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/388,851

(22) Filed: Jul. 29, 2021

(65) Prior Publication Data

US 2022/0075495 A1    Mar. 10, 2022

(30) Foreign Application Priority Data

Sep. 7, 2020 (JP) .............................. JP2020-149621

(51) Int. Cl.
*G06F 3/041* (2006.01)
*G06F 3/044* (2006.01)

(52) U.S. Cl.
CPC ........ *G06F 3/04162* (2019.05); *G06F 3/0442* (2019.05); *G06F 3/04186* (2019.05); *G06F 2203/04104* (2013.01)

(58) Field of Classification Search
CPC .... G06F 3/03545; G06F 3/038; G06F 3/0383; G06F 3/04162; G06F 3/04166; G06F 3/04186; G06F 3/0421; G06F 3/0441; G06F 3/0442; G06F 3/0446
See application file for complete search history.

(56) References Cited

U.S. PATENT DOCUMENTS

| | | | | |
|---|---|---|---|---|
| 2016/0306497 | A1* | 10/2016 | Nagai | G06F 3/03545 |
| 2018/0113523 | A1* | 4/2018 | Hara | G06F 3/0446 |
| 2020/0081577 | A1* | 3/2020 | Nomura | G06F 3/0441 |
| 2020/0257407 | A1* | 8/2020 | Yamamoto | G06F 3/0442 |

FOREIGN PATENT DOCUMENTS

| | | |
|---|---|---|
| JP | 2016-206803 A | 12/2016 |
| WO | 2017/002272 A1 | 1/2017 |
| WO | 2018/225204 A1 | 12/2018 |
| WO | WO-2018225204 A1 * 12/2018 | ......... G06F 3/03545 |

OTHER PUBLICATIONS

International Search Report dated Sep. 12, 2017, for the corresponding International Patent Application No. PCT/JP2017/021263, 2 pages.

* cited by examiner

*Primary Examiner* — Chun-Nan Lin (74) *Attorney, Agent, or Firm* — Seed IP Law Group LLP (57) ABSTRACT

A method of palm rejection is executed by a sensor controller that is connected to a plurality of sensor electrodes and that detects a downlink signal transmitted from an active pen. The method includes determining whether or not a phase of the detected downlink signal matches a phase shared in advance between the sensor controller and the active pen, and outputting, when it is determined that the phases match, a position of the active pen derived on the basis of a distribution of levels of the downlink signal in the plurality of sensor electrodes.

14 Claims, 9 Drawing Sheets

METHOD OF PALM REJECTION AND SENSOR CONTROLLER

BACKGROUND

Technical Field

The present disclosure relates to a method of palm rejection and a sensor controller.

Description of the Related Art

A position detector is known that supports pen input by an active pen. The active pen is an electronic pen configured to transmit a downlink signal from a pen tip electrode provided at a pen tip. The position detector attempts to detect the downlink signal in a plurality of sensor electrodes arranged in a touch surface and, based on the downlink signal detection, detects an instruction position that is pointed to by the active pen.

The downlink signal is also transmitted to the body of a user holding the active pen, through a housing of the active pen. Therefore, the downlink signal is transmitted not only from the pen tip electrode but also from the palm of the user. The downlink signal transmitted from the palm is also detected by the sensor electrodes when the user puts the hand on the touch surface. The position detected on the basis of the result of this detection does not properly reflect the instruction position of the active pen, and the position needs to be excluded from the instruction position of the active pen. Hereinafter, the exclusion of the contact position of the palm from the instruction position of the active pen will be referred to as "palm rejection."

An example of a technique for performing the palm rejection is disclosed in PCT Patent Publication No. WO2018/225204 (hereinafter, referred to as Patent Document 1). In the technique, a detection result of a touch by a finger is combined with a reception result of a downlink signal to determine whether the detected position of the downlink signal is a contact position of the palm or an instruction position of the active pen. The contact position of the palm is excluded from the instruction position of the active pen on the basis of the result of the determination.

However, the result of touch detection is necessary in the palm rejection described in Patent Document 1. Therefore, the technique cannot be executed in a mode in which the touch detection is stopped and only the detection of the active pen is performed (pen only mode).

In addition, to properly determine the contact position of the palm in the palm rejection described in Patent Document 1, the area of a region detected based on the contact by the palm in the touch detection needs to be wide enough so that it can be distinguished from a region detected based on a normal contact by a finger. Therefore, the contact position cannot be properly determined when the touch by the palm is light so as to be detected only in a (narrow) region, which cannot be distinguished from a region detected based on a normal contact by a finger.

BRIEF SUMMARY

Therefore, an aspect of the present disclosure is to provide a method of palm rejection and a sensor controller that can exclude a contact position of a palm from an instruction position of an active pen, which will not rely on a detection result of a detection process, such as a touch detection process, other than the detection process of detecting the active pen.

The present disclosure provides a method of palm rejection executed by a sensor controller that is connected to a plurality of sensor electrodes and that detects a downlink signal transmitted from an active pen. The method includes determining whether or not a phase of the detected downlink signal matches a phase shared in advance between the sensor controller and the active pen, and outputting, responsive to a determination that the phases match, a position of the active pen derived on the basis of a distribution of levels of the downlink signal in the plurality of sensor electrodes.

The present disclosure provides a sensor controller that is connected to a plurality of sensor electrodes and that detects a downlink signal having a predetermined frequency or a predetermined waveform transmitted from an active pen. The sensor controller determines whether or not a phase of the detected downlink signal matches a phase shared in advance between the sensor controller and the active pen, and outputs, responsive to a determination that the phases match, a position of the active pen derived on the basis of a distribution of levels of the downlink signal in the plurality of sensor electrodes.

Assuming that the human body is not sufficiently grounded, the downlink signal detected through the human body is a signal with a phase inverted from the phase of the downlink signal detected through the pen tip electrode. According to the present disclosure, because the phase of the downlink signal is determined, it is possible to discern the position derived on the basis of the downlink signal detected through the human body. Therefore, the contact position of the palm can be excluded from the instruction position of the active pen, without having to rely on a result of a detection process, such as a touch detection process, other than the detection process of detecting the active pen.

DETAILED DESCRIPTION

An embodiment of the present disclosure will now be described in detail with reference to the attached drawings.

Figure 1:
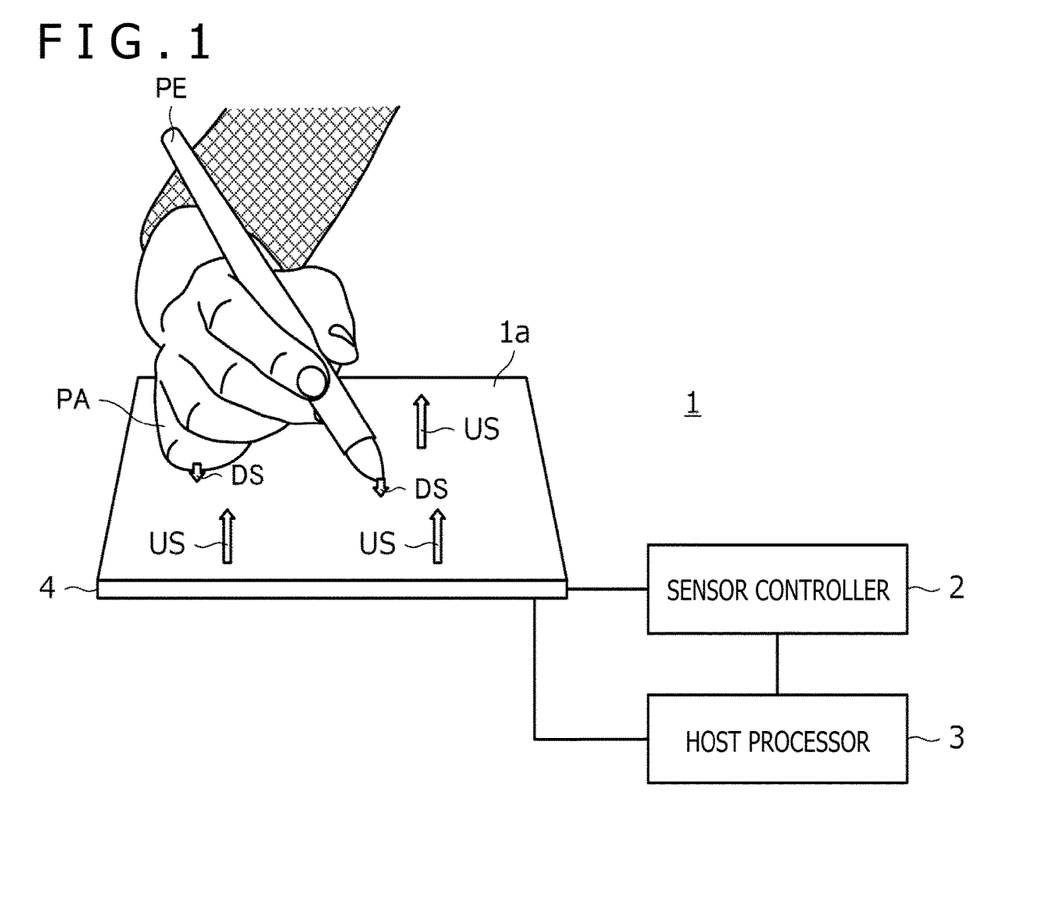
FIG. 1 depicts a configuration of an electronic device according to an embodiment of the present disclosure.

FIG. 1 depicts a configuration of an electronic device 1 according to the present embodiment. The electronic device 1 is an apparatus that supports pen input and finger touch input, such as a tablet computer. As illustrated in FIG. 1, the electronic device 1 includes a sensor controller 2, a host processor 3, and a sensor electrode group combined with a display 4.

FIG. 1 also illustrates an active pen PE for pen input on the electronic device 1. The active pen PE is a stylus in compliance with an active capacitive system. The active pen PE can perform two-way communication with the sensor controller 2 or can perform one-way signal transmission to the sensor controller 2. Hereinafter, a signal transmitted from the sensor controller 2 to the active pen PE will be referred to as an uplink signal US, and a signal transmitted from the active pen PE to the sensor controller 2 will be referred to as a downlink signal DS. A user operates the active pen PE on a panel surface 1a (touch surface) provided on the electronic device 1, to make pen input, and traces the panel surface 1a with a finger to make finger touch input.

The host processor 3 is a processor that controls the entire electronic device 1. Operations of components in the electronic device 1 to be described later are executed under the control of the host processor 3. The sensor controller 2 is an integrated circuit that uses a sensor electrode group (described later) in the sensor electrode group combined with a display 4 to derive the position of an indicator, such as the active pen PE and a finger of the user, in the panel surface 1a and to receive data transmitted from the active pen PE. The sensor controller 2 is configured to sequentially output the derived position and the data received from the active pen PE, to the host processor 3. The host processor 3 generates digital ink and renders a drawing on the basis of the position and the data input in this way.

The sensor electrode group combined with a display 4 is an apparatus including a combination of a sensor electrode group for realizing pen input and finger touch input and an electrode group that forms a display. Examples of specific types of the sensor electrode group combined with a display 4 include an in-cell type and an on-cell type. In the in-cell type, part or whole of the electrode group included in the display is also used as part or whole of the sensor electrode group. In the on-cell type, the electrode group included in the display and the sensor electrode group are electrically separated. The sensor electrode group combined with a display 4 is the in-cell type in the description of the present embodiment. However, the present disclosure can also be applied to a case in which the sensor electrode group combined with a display 4 is the on-cell type or a case in which the sensor electrode group and the display are separate apparatuses. Various displays such as a liquid crystal display and an organic electroluminescence (EL) display can be used as the display included in the sensor electrode group combined with a display 4. In the description of the present embodiment, the display is a thin film transistor (TFT) liquid crystal display.

Figure 2:
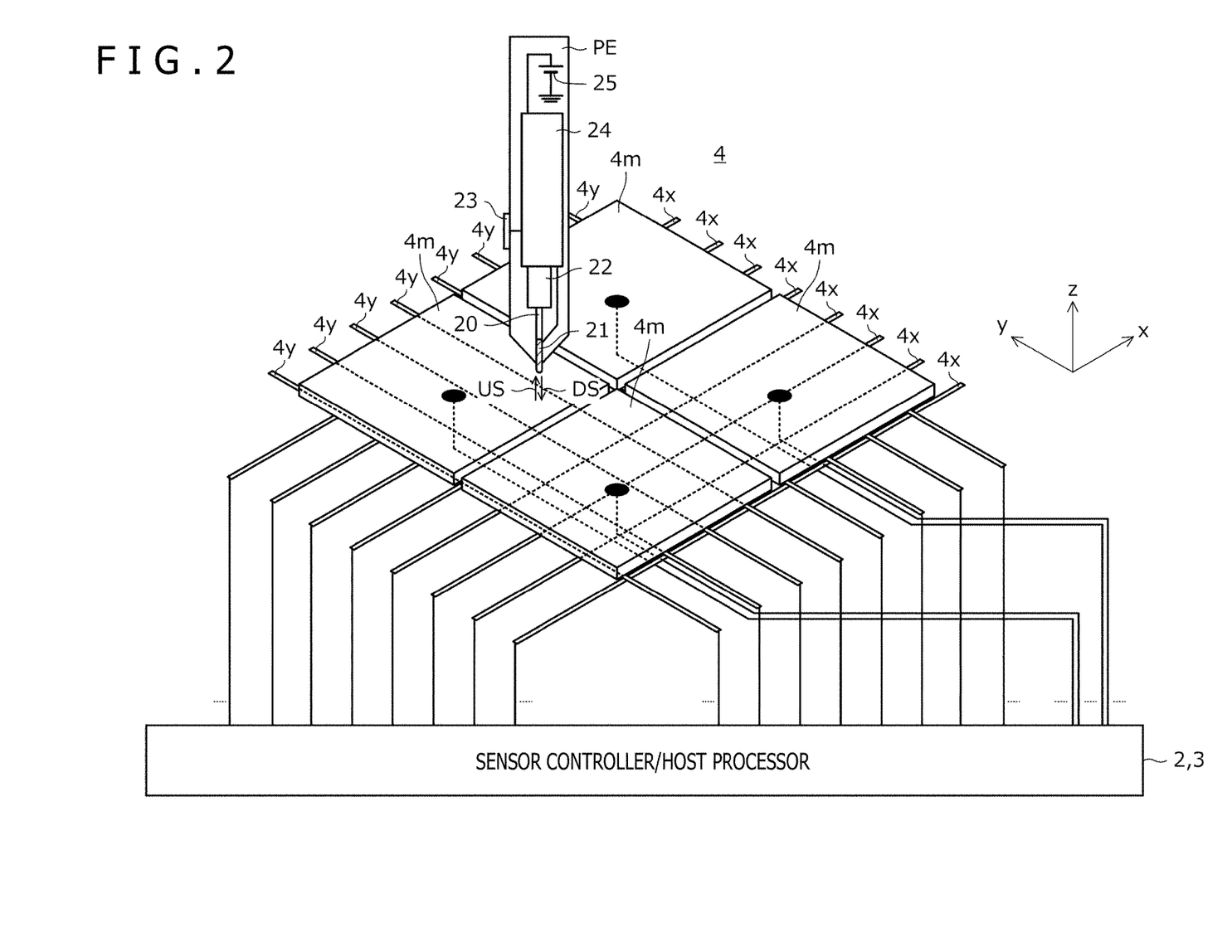
FIG. 2 depicts details of a sensor electrode group combined with a display.

FIG. 2 depicts details of the sensor electrode group combined with a display 4. As illustrated in FIG. 2, the sensor electrode group combined with a display 4 includes, from the side closer to the panel surface 1a, a plurality of island-like conductors 4m arranged in a matrix in an xy plane, a plurality of linear conductors 4x extending in an x-direction and arranged side by side along a y-direction, and a plurality of linear conductors 4y extending in the y-direction and arranged side by side along the x-direction. Although the actual sensor electrode group combined with a display 4 includes various additional components such as a liquid crystal layer, those additional components are not illustrated in FIG. 2.

The plurality of island-like conductors 4m, the plurality of linear conductors 4y, and the plurality of linear conductors 4x can be each selectably connectable, by switching, either to the host processor 3 or to the sensor controller 2. The host processor 3 executes the switching in a time division manner. The sensor electrode group combined with a display 4 is used as a display when the conductors are connected to the host processor 3, and is used as a sensor electrode group when the conductors are connected to the sensor controller 2.

When the sensor electrode group combined with a display 4 is used as a display, the host processor 3 supplies common potential Vcom to each of the plurality of island-like conductors 4m. The host processor 3 uses the plurality of linear conductors 4x as gate lines for controlling on/off of pixel transistors (not illustrated), and uses the plurality of linear conductors 4y as data/source lines for supplying data to pixels.

On the other hand, when the sensor electrode group combined with a display 4 is used as a sensor electrode group, the sensor controller 2 uses the plurality of island-like conductors 4m as sensor electrodes to perform self-capacitive detection of the finger touch, and uses the plurality of linear conductors 4x and 4y as sensor electrodes to perform active capacitive detection of the active pen PE.

FIG. 2 also illustrates an internal configuration of the active pen PE. As illustrated in FIG. 2, the active pen PE includes a core body 20, a pen tip electrode 21, a pressure sensor 22, a switch 23, a control circuit 24, and a battery 25.

The core body 20 is a member included in a pen tip of the active pen PE. A proximal end of the core body 20 is connected to the pressure sensor 22. The pen tip electrode 21 is an electrode provided near a distal end of the core body 20 and is electrically connected to the control circuit 24. The pressure sensor 22 is a sensor that detects the pressure applied to the distal end of the core body 20. The switch 23 is a switch element provided on the surface of a housing of the active pen PE, and the user can turn on and off the switch 23.

The control circuit 24 is a circuit that uses power supplied from the battery 25, to operate and execute various processes. Examples of the processes executed by the control circuit 24 include control of the respective components of the active pen PE, as well as a process of controlling the potential of the pen tip electrode 21 to transmit the downlink signal DS and a process of detecting and demodulating a change in the potential of the pen tip electrode 21 to receive the uplink signal US.

Figure 3A:
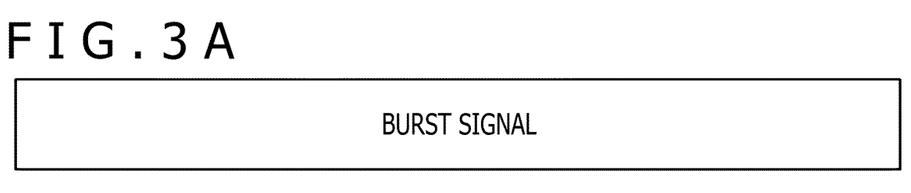
FIG. 3A and FIG. 3B depict formats of a downlink signal transmitted from an active pen.
Figure 3B:
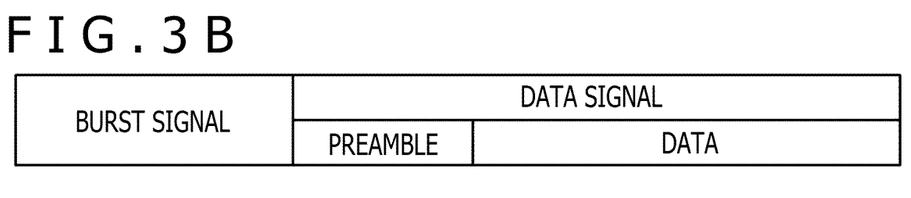

FIG. 3A and FIG. 3B depict formats of the downlink signal DS transmitted from the control circuit 24. FIG. 3A illustrates the downlink signal DS transmitted from the control circuit 24 that has not detected the sensor controller 2 yet when the sensor controller 2 and the active pen PE perform two-way communication. The downlink signal DS in this case includes a burst signal that is an unmodulated carrier signal having a predetermined frequency.

FIG. 3B illustrates the downlink signal DS transmitted from the control circuit 24 according to the received uplink signal US when the sensor controller 2 and the active pen PE perform two-way communication. A similar downlink signal DS is also used when the active pen PE performs one-way signal transmission to the sensor controller 2. The downlink signal DS includes a burst signal that is an unmodulated carrier signal having a predetermined frequency, and also includes a data signal in which a carrier signal having a predetermined frequency is modulated with transmission data.

The transmission data transmitted in the data signal includes a preamble indicating the start of the data signal and data requested by the uplink signal US as illustrated in FIG. 3B. Note that data for error detection, such as a cyclic redundancy check (CRC) code, may be arranged at the end of the data signal.

The preamble is predetermined data shared in advance between the sensor controller 2 and the active pen PE and is used by the sensor controller 2 to detect the data signal from the reception signal. The data requested by the uplink signal US includes a pen pressure value indicating the pressure detected by the pressure sensor 22, switch information indicating on/off state of the switch 23, a pen ID stored in a memory of the control circuit 24, and the like. The control circuit 24 acquires data from the pressure sensor 22 and the like according to a command included in the received uplink signal US and arranges the data in the data signal.

Figure 4:
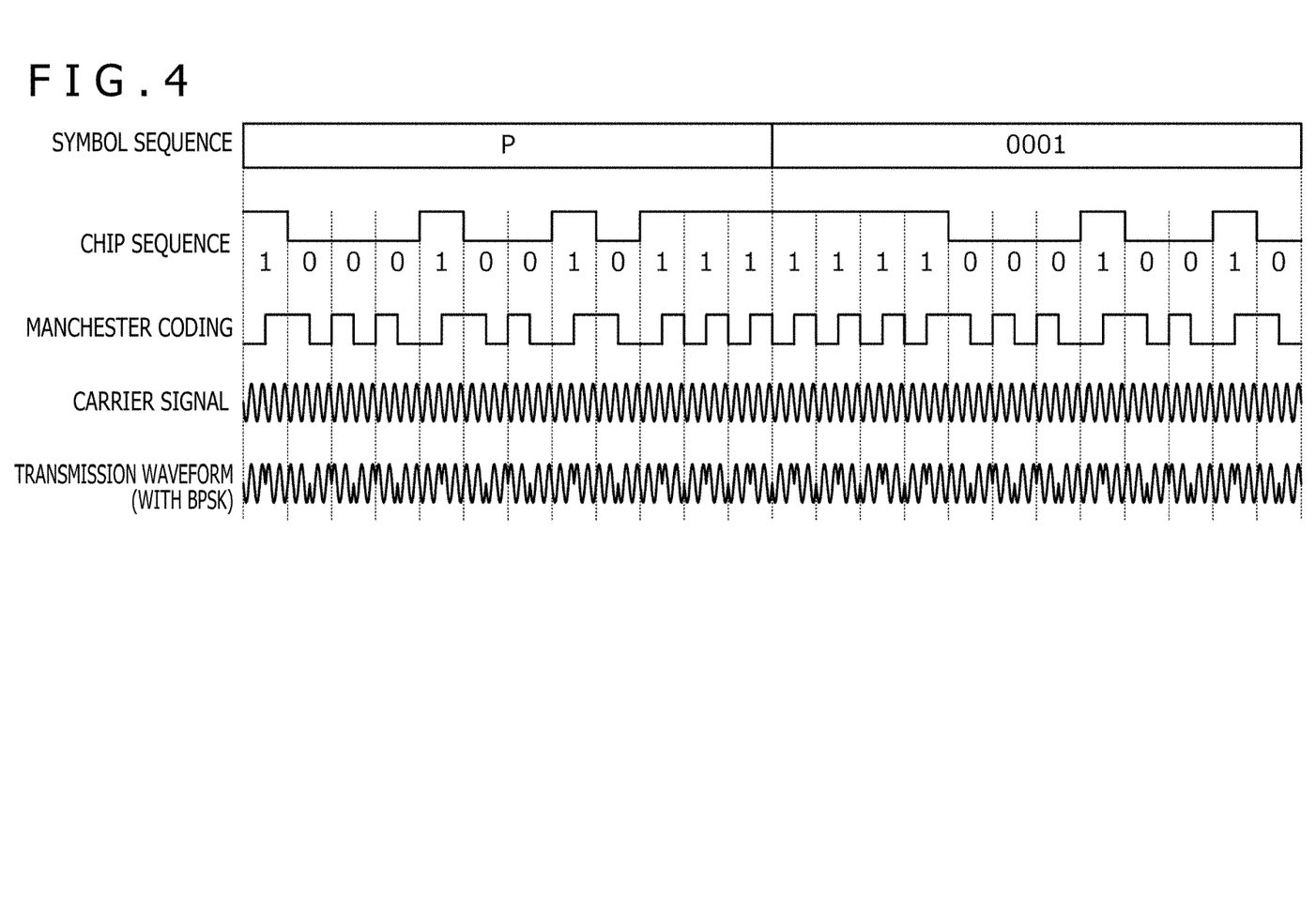
FIG. 4 is an explanatory diagram of a modulation process of a data signal.

FIG. 4 is an explanatory diagram of a modulation process of the data signal. As illustrated in FIG. 4, the control circuit 24 first acquires a symbol sequence included in the transmission data. A symbol is a unit of information used for modulation. The symbols include values converted into bit sequences and values not converted into bit sequences. "P" illustrated in FIG. 4 is an example of a value of the symbol not converted into a bit sequence. The value converted into a bit sequence is a value corresponding to a bit sequence of a predetermined number of bits, and FIG. 4 illustrates an example of a bit sequence of four bits.

The control circuit 24 stores, in advance, a table associating the values of the symbols with spread codes (chip sequences) and converts each of the symbols included in the transmission data, into a chip sequence according to the table. The control circuit 24 then applies Manchester coding to the obtained chip sequences so that 0 or 1 will not be repeated, and uses the chip sequences that have been subjected to the Manchester coding to modulate the carrier signal. Although FIG. 4 illustrates an example of using binary phase shift keying (BPSK) to perform the modulation, other modulation systems may be used. The waveform of the carrier signal modulated in this way provides the waveform of the downlink signal DS transmitted from the pen tip electrode 21 (transmission waveform).

With reference again to FIG. 2, an example of the case in which the sensor controller 2 and the active pen PE perform two-way communication is used to describe an outline of the detection of the active pen PE. The sensor controller 2 that has not yet detected the active pen PE uses both the plurality of linear conductors 4x and the plurality of linear conductors 4y or either the plurality of linear conductors 4x or the plurality of linear conductors 4y to periodically transmit the uplink signal US. The active pen PE that has received the uplink signal US first transmits the downlink signal DS of the type illustrated in FIG. 3A. The sensor controller 2 sequentially scans all of the plurality of linear conductors 4x and the plurality of linear conductors 4y to acquire the signal level of the downlink signal DS in each of the linear conductors 4x and 4y. The sensor controller 2 then derives the position of the active pen PE on the basis of the distribution of signal levels and stores the position in the memory (global scan).

Subsequently, the active pen PE that has again received the uplink signal US transmits the downlink signal DS of the type illustrated in FIG. 3B. The sensor controller 2 that receives the downlink signal DS first uses only a predetermined number of linear conductors 4x and 4y positioned near the position of the active pen PE stored in the memory, to receive the burst signal, and newly derives the position of the active pen PE on the basis of the distribution of signal levels of the burst signal. The sensor controller 2 updates the position of the active pen PE stored in the memory, to the derived position (local scan). The sensor controller 2 then uses one linear conductor 4x or linear conductor 4y closest to the position of the active pen PE to receive the data signal to thereby acquire the data transmitted by the active pen PE. The position stored in the memory and the acquired data are sequentially output from the sensor controller 2 to the host processor 3 as described above.

The one-way transmission of the downlink signal DS from the active pen PE to the sensor controller 2 will be briefly described. The active pen PE is configured to periodically transmit the downlink signal DS of the type illustrated in FIG. 3B. When the active pen PE is not yet detected, the sensor controller 2 performs the global scan on the basis of the downlink signal DS. After temporarily storing the position of the active pen PE in the memory in the global scan, the sensor controller 2 performs the local scan and receives the data signal on the basis of the downlink signal DS continuously transmitted from the active pen PE. In this way, the sensor controller 2 can update the position of the active pen PE and acquire the data transmitted from the active pen PE, as in the case where the sensor controller 2 and the active pen PE perform the two-way communication. The position stored in the memory and the acquired data are also sequentially output from the sensor controller 2 to the host processor 3 as in the case where the sensor controller 2 and the active pen PE perform the two-way communication.

FIG. 1 will be further described. When the active pen PE transmits the downlink signal DS, the downlink signal DS is also transmitted to the body of the user holding the active pen PE, through the housing of the active pen PE. As a result, the downlink signal DS is also transmitted from a palm PA of the user as illustrated in FIG. 1 when the user places the hand on the panel surface 1a. Consequently, there are two peaks in the signal levels detected in the global scan, and the sensor controller 2 may not properly detect the position of the active pen PE. Therefore, the present embodiment utilizes that the downlink signal DS includes a predetermined waveform portion (that is, the transmission waveform corresponding to a preamble) shared in advance between the sensor controller 2 and the active pen PE, and on the basis of the phase of the predetermined waveform portion, the sensor controller 2 can determine whether or not the phase of the received downlink signal DS matches the phase shared in advance between the sensor controller 2 and the active pen PE, to thereby exclude the contact position of the palm PA from the instruction position of the active pen PE.

To realize the exclusion, the phase of the downlink signal DS needs to be determined before the determination of the instruction position of the active pen PE. Therefore, a plurality of positions need to be detected in the global scan, and the local scan and the data signal reception need to be performed at each of these plurality of positions. In the present embodiment, this process is realized by forming a reception unit in the sensor controller 2.

Hereinafter, the relation between the downlink signal DS and the phase will be described first with reference to FIGS. 5 to 7. The configuration of the reception unit provided in the sensor controller 2 will be described next with reference to FIG. 8, and then, the process executed by the sensor controller 2 will be described in detail with reference to FIG. 9.

Figure 5:
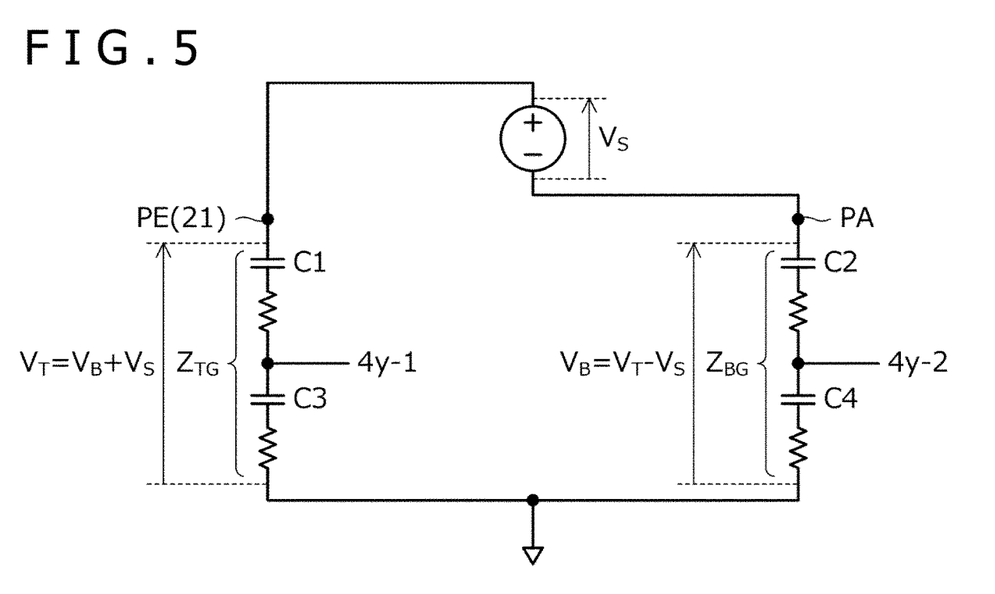
FIG. 5 depicts an equivalent circuit of the active pen, a palm, and the sensor electrode group combined with a display.

FIG. 5 depicts an equivalent circuit of the active pen PE, the palm PA, and the sensor electrode group combined with a display 4. In the equivalent circuit, it is assumed that the human body is a complete conductor and is floating. As illustrated in FIG. 5, the equivalent circuit includes four types of capacitance C1 to C4. The capacitance C1 is a coupling capacitance between the linear conductor 4y which is closest to the pen tip electrode 21 (referred to as a "linear conductor 4y-1") and the pen tip electrode 21. The capacitance C2 is a coupling capacitance between the linear conductor 4y which is closest to the palm PA (referred to as a "linear conductor 4y-2") and the palm PA. The capacitance C3 is a coupling capacitance between the linear conductor 4y-1 and the ground end of the electronic device 1, and the capacitance C4 is a coupling capacitance between the linear conductor 4y-2 and the ground end of the electronic device 1.

The relation between potential $V_T$ of the pen tip electrode 21 with respect to the ground end of the electronic device 1, potential $V_B$ of the palm PA with respect to the ground end of the electronic device 1, and potential $V_s$ of the downlink signal DS is as indicated in the following Equation (1).

$$V_T - V_B = V_S \quad (1)$$

The following Equation (2) is established by Kirchhoff's first law, where $Z_{TG}$ represents the impedance between the ground end of the electronic device 1 and the pen tip electrode 21, and $Z_{BG}$ represents the impedance between the ground end of the electronic device 1 and the palm PA.

$$V_T/Z_{TG} V_B/Z_{BG} = 0 \quad (2)$$

The following Equation (3) and Equation (4) can be obtained from Equation (1) and Equation (2).

$$V_T = -V_S Z_{BG}/(Z_{TG} + Z_{BG}) \quad (3)$$

$$V_B = V_S Z_{BG}/(Z_{TG} + Z_{BG}) \quad (4)$$

It can be understood from Equation (3) and Equation (4) that the potential $V_T$ of the pen tip electrode 21 and the potential $V_B$ of the palm PA are in opposite phases. The sensor controller 2 according to the present embodiment uses this relation to execute the process of excluding the contact position of the palm PA from the instruction position of the active pen PE.

Figure 6A:
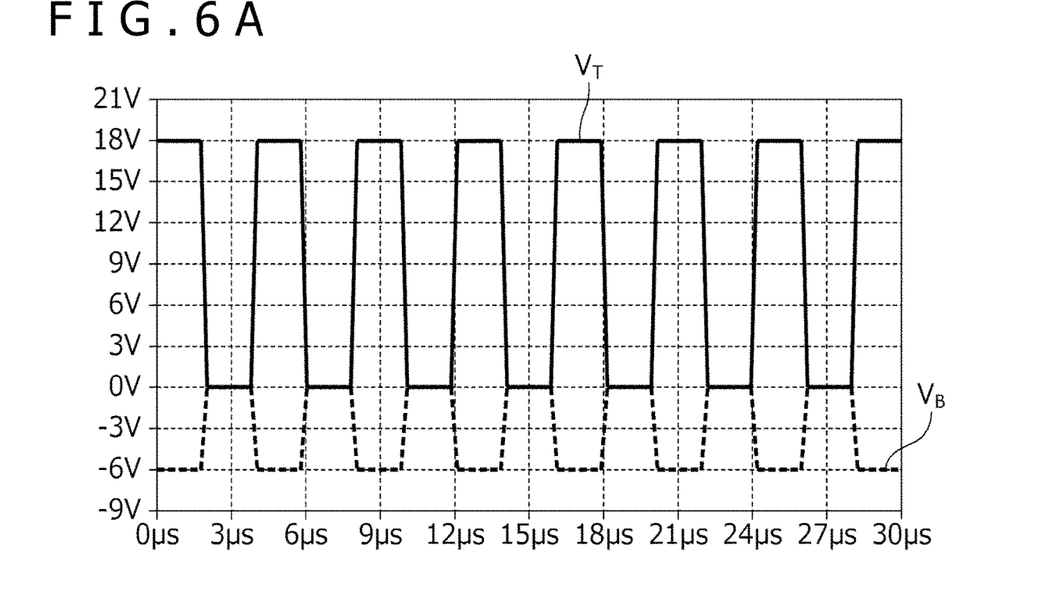
FIG. 6A depicts time variation of the potential of a pen tip electrode and the potential of the palm simulated by using the equivalent circuit of FIG. 5.
Figure 6B:
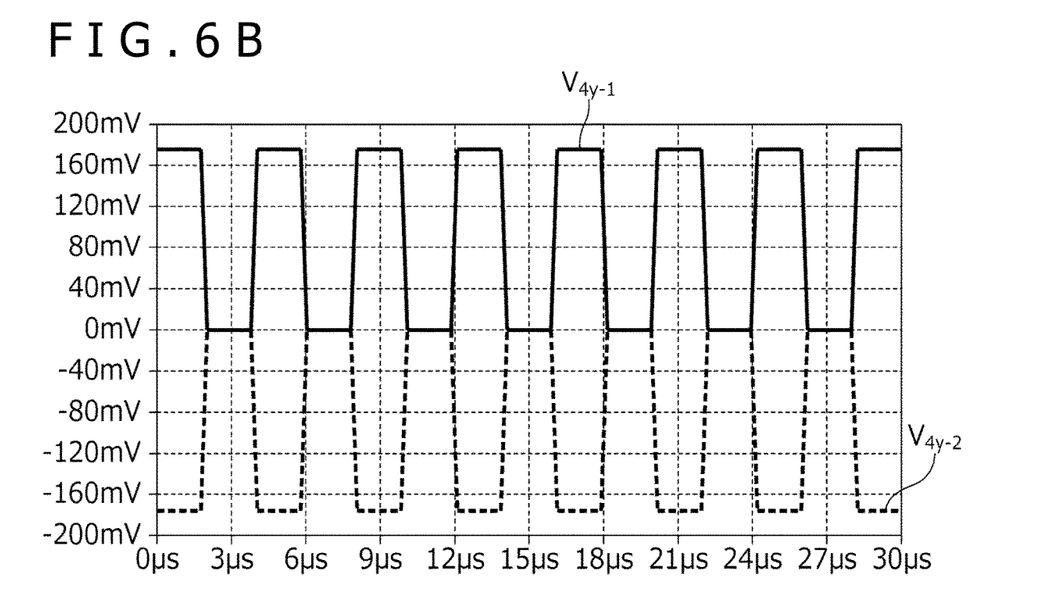
FIG. 6B depicts time variation of the potential of linear conductors simulated by using the equivalent circuit of FIG. 5.
Figure 7A:
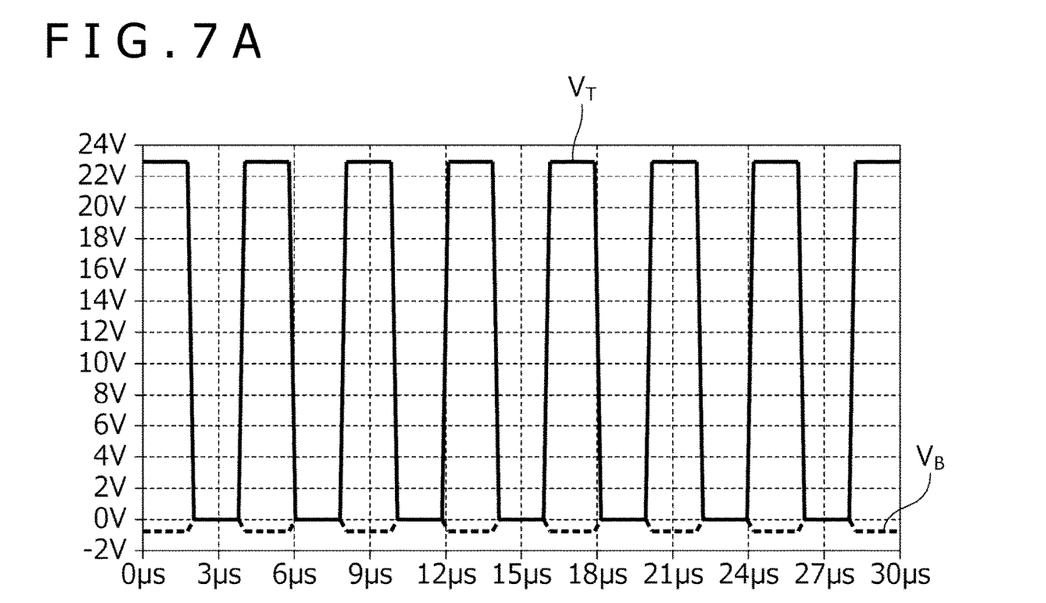
FIG. 7A depicts time variation of the potential of the pen tip electrode and the potential of the palm simulated by using the equivalent circuit of FIG. 5.

FIG. 6A and FIG. 7A depict time variation of the potential $V_T$ and the potential $V_B$ simulated by using the equivalent circuit of FIG. 5. FIG. 6B and FIG. 7B depict time variation of potential $V_{4y\text{-}1}$ of the linear conductor 4y-1 and potential $V_{4y\text{-}2}$ of the linear conductor 4y-2 simulated by using the equivalent circuit of FIG. 5. The coupling capacitance C1 is 1 pF in the case illustrated in FIG. 6A and FIG. 6B, and the coupling capacitance C1 is 0.1 pF in the case illustrated in FIG. 7A and FIG. 7B. In FIG. 6A to FIG. 7B, the coupling capacitance C2 is 3 pF, the coupling capacitance C3 is 100 pF, and the coupling capacitance C4 is 100 pF.

As illustrated in FIG. 6A and FIG. 7A, the potential $V_T$ of the pen tip electrode 21 and the potential $V_B$ of the palm PA are in opposite phases. This is a result as also indicated in Equation (3) and Equation (4) above. On the other hand, it can be recognized from the results of FIG. 6A and FIG. 7A that the amplitude of the potential $V_B$ is smaller than the amplitude of the potential $V_T$.

Figure 7B:
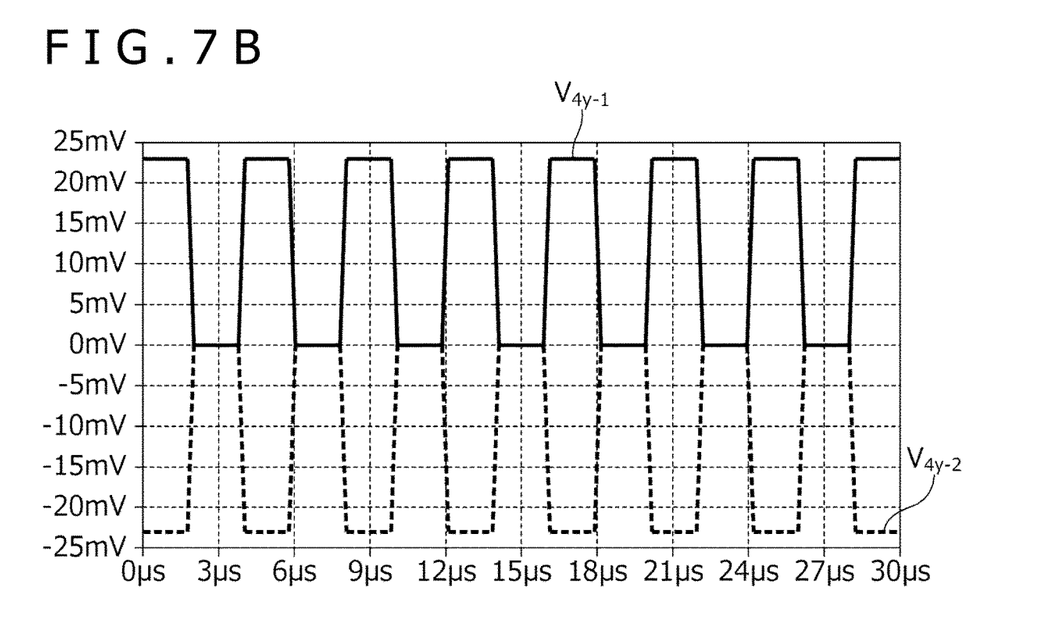
FIG. 7B depicts time variation of the potential of the linear conductors simulated by using the equivalent circuit of FIG. 5.

As illustrated in FIG. 6B and FIG. 7B, the potential $V_{4y\text{-}1}$ of the linear conductor 4y-1 and the potential $V_{4y\text{-}2}$ of the linear conductor 4y-2 are in opposite phases, and this is similar to the potential $V_T$ and the potential $V_B$. However, unlike the potential $V_T$ and the potential $V_B$, the potential $V_{4y\text{-}1}$ and the potential $V_{4y\text{-}2}$ have the same value of amplitude. The sensor controller 2 actually detects the potential $V_{4y\text{-}1}$ and $V_{4y\text{-}2}$ instead of the potential $V_T$ and $V_B$. Therefore, on the basis of the results of FIG. 6B and FIG. 7B, it can be understood that the instruction position of the active pen PE and the contact position of the palm PA cannot be distinguished from each other just by looking at the amplitude of the detected potential. Therefore, the sensor controller 2 according to the present embodiment executes a process of referring to the phases of the potential $V_{4y\text{-}1}$ and $V_{4y\text{-}2}$ to exclude the contact position of the palm PA from the instruction position of the active pen PE.

Figure 8:
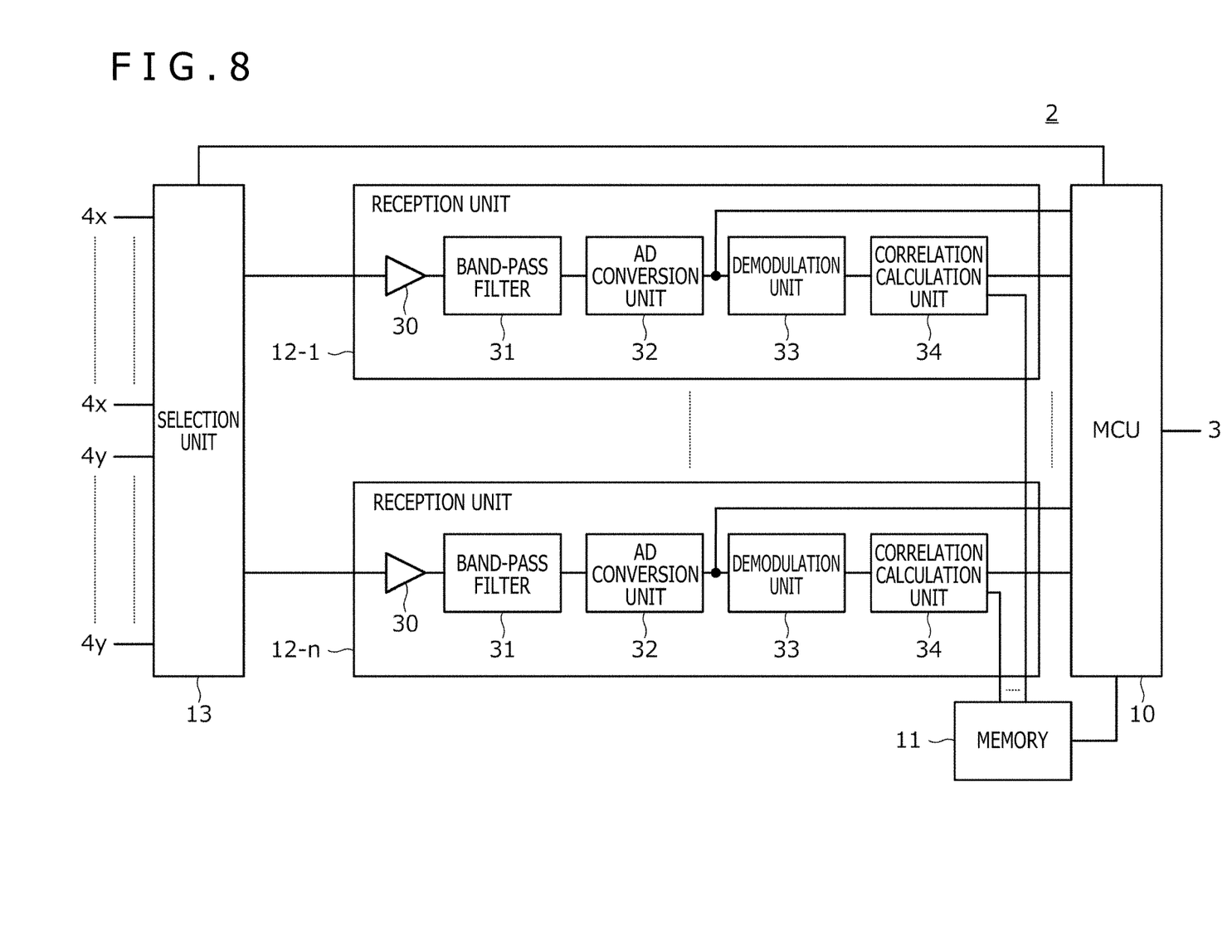
FIG. 8 depicts a configuration of a sensor controller according to an embodiment of the present disclosure.

FIG. 8 depicts a configuration of the sensor controller 2 according to the present embodiment. FIG. 8 illustrates only the part related to the reception of the downlink signal DS among various components provided in the sensor controller 2. As illustrated in FIG. 8, the sensor controller 2 according to the present embodiment includes a micro control unit (MCU) 10, a memory 11, n reception units 12-1 to 12-n, and a selection unit 13.

The MCU 10 is a processor that reads and executes a program stored in the memory 11. Processes executed by the MCU 10 include control of the respective components in the sensor controller 2. The memory 11 is a storage device including one of or both a volatile memory and a non-volatile memory. The memory 11 stores the program executed by the MCU 10 and functions as a work memory of the MCU 10. Functions of the work memory include a function of temporarily storing one or more positions derived by the MCU 10 as a result of the global scan and the local scan. The memory 11 also plays a role of storing the same table as the table of spread codes (chip sequences) stored in the control circuit 24 of the active pen PE.

Each of the reception units 12-1 to 12-n includes a buffer 30, a band-pass filter 31, an analog-to-digital (AD) conversion unit 32, a demodulation unit 33, and a correlation calculation unit 34. The buffer 30 is connected to one of the plurality of linear conductors 4x and the plurality of linear conductors 4y through the selection unit 13. The buffer 30 plays a role of amplifying the current led to (induced in) the connected linear conductors and supplying the current to the band-pass filter 31.

The band-pass filter 31 is a filter circuit that extracts, from the output current of the buffer 30, only signals in a predetermined frequency band to which the frequency of the downlink signal DS belongs. The band-pass filter 31 plays a role of removing low frequency noise and harmonic noise from the output current of the buffer 30.

The AD conversion unit 32 is a circuit that samples and quantizes the output signal of the band-pass filter 31 to acquire the reception level values of the downlink signal DS. Note that the sampling frequency of the AD conversion unit 32 is set to a frequency sufficiently higher than the frequency of the downlink signal DS. The AD conversion unit 32 is configured to sequentially supply the acquired reception level values to the MCU 10 and the demodulation unit 33.

The demodulation unit 33 is a circuit that demodulates the downlink signal DS on the basis of the series of reception level values output from the AD conversion unit 32, to acquire the series of chip sequences transmitted from the active pen PE. The series of chip sequences acquired by the demodulation unit 33 is supplied to the correlation calculation unit 34.

The correlation calculation unit 34 is a circuit that calculates the correlation between the series of chip sequences supplied from the demodulation unit 33 and the plurality of chip sequences stored in advance in the memory 11, to restore the sequence of symbols included in the downlink signal DS. The sequence of symbols restored by the correlation calculation unit 34 is supplied to the MCU 10.

The selection unit 13 is a multiplexer provided between the plurality of linear conductors 4x and 4y and the reception units 12-1 to 12-n. The connection state of the selection unit 13 is controlled by the MCU 10. Specifically, the MCU 10 controls the selection unit 13 to sequentially connect the plurality of linear conductors 4x and 4y to the reception unit 12-1 in the global scan. The MCU 10 then refers to the reception level values sequentially output from the AD conversion unit 32 of the reception unit 12-1, to acquire the distribution of reception levels of the downlink signal DS, thereby deriving the position of the peak of the distribution. When there are a plurality of peaks in the distribution, there are also a plurality of positions derived. The MCU 10 stores, in the memory 11, the derived one or more positions as detection results of the global scan.

In the local scan, the MCU 10 allocates a different reception unit 12-k (k is one of 1 to n) to each of one or more positions stored in the memory 11 and controls the selection unit 13 to sequentially connect a predetermined number of linear conductors 4x and 4y positioned near the corresponding position, to each of the allocated reception units 12-k. The MCU 10 refers to the reception level values sequentially output from the AD conversion unit 32 of the reception unit 12-k, as a result of the control, to thereby acquire the distribution of reception level of the downlink signal DS for each of the reception units 12-k. The MCU 10 then derives the position of the peak of the distribution for each of the reception units 12-k and overwrites the corresponding position stored in the memory 11, with the derived position.

In receiving the data signal, the MCU 10 allocates a different reception unit 12-k to each of one or more positions stored in the memory 11 and controls the selection unit 13 to connect the linear conductor 4x (or the linear conductor 4y) closest to the corresponding position, to each of the allocated reception units 12-k. The MCU 10 then refers to the symbol sequences sequentially output from the correlation calculation unit 34 of each reception unit 12-k, as a result of the control, and attempts to detect the preamble first. In this case, the MCU 10 also attempts to detect, in addition to the preamble stored in advance, a part (referred to as an "inverted preamble") corresponding to the preamble in the symbol sequences output when the phase of the downlink signal DS input to the reception units 12-k is inverted. When the preamble is detected, the MCU 10 determines that the phase of the downlink signal DS matches the phase shared in advance between the sensor controller 2 and the active pen PE. On the other hand, when the inverted preamble is detected, the MCU 10 determines that the phase of the downlink signal DS does not match (inverted) the phase shared in advance between the sensor controller 2 and the active pen PE.

As a result of the determination, the MCU 10 acquires the transmission data of the active pen PE on the basis of the symbol sequences output from the reception unit 12-k that has received the downlink signal DS for which the MCU 10 has determined that the phase matches the phase shared in advance between the sensor controller 2 and the active pen PE. The MCU 10 outputs the transmission data to the host processor 3 along with the position stored in the memory 11 in relation to the reception unit 12-k. The other positions are not output to the host processor 3, and therefore, the contact position of the palm PA can be excluded from the instruction position of the active pen PE.

Figure 9:
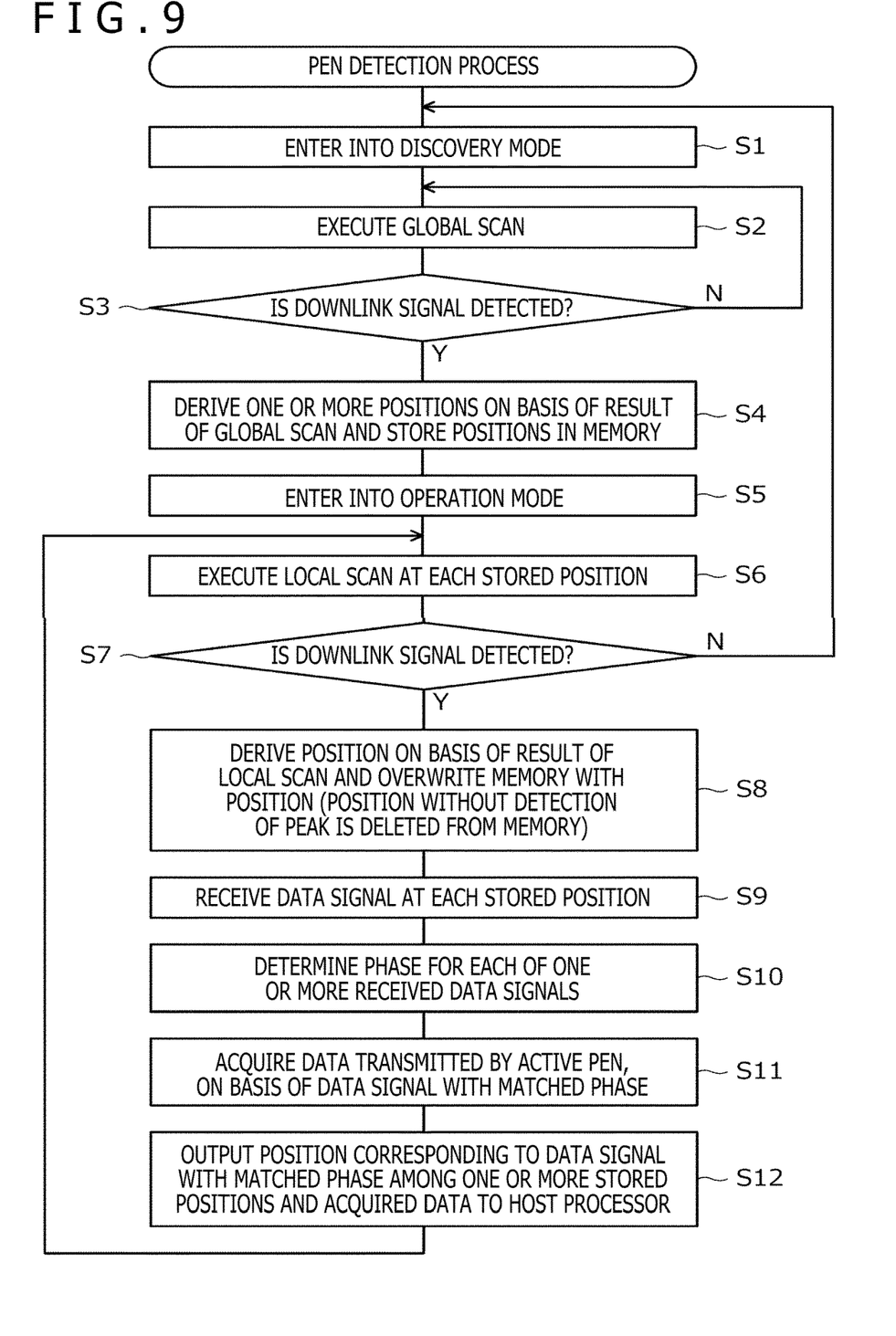
FIG. 9 is a flow chart illustrating a pen detection process executed by the sensor controller.

FIG. 9 is a flow chart illustrating the pen detection process executed by the sensor controller 2. As illustrated in FIG. 9, the sensor controller 2 first enters into a discovery mode for detecting the active pen PE (step S1) and executes the global scan for sequentially scanning all of the plurality of linear conductors 4x and 4y (step S2). The sensor controller 2 determines whether or not the downlink signal DS is detected as a result of the execution of the global scan (step S3), and returns to step S2 to repeat the global scan if the downlink signal DS is not detected.

On the other hand, if the sensor controller 2 determines that the downlink signal DS is detected in step S3, the sensor controller 2 derives one or more positions on the basis of the result of the global scan and stores the positions in the memory 11 illustrated in FIG. 8 (step S4). The details of the derivation are as described above. The sensor controller 2 which has finished with step S4 enters into an operation mode for receiving pen input of the detected active pen PE (step S5).

The sensor controller 2 which has entered into the operation mode uses the reception units 12-1 to 12-n illustrated in FIG. 8, to perform the local scan in parallel at one or more positions stored in the memory 11 (step S6). The sensor controller 2 then determines whether or not the downlink signal DS is detected as a result of the execution of the local scan (step S7), and returns to the discovery mode to continue the process if the downlink signal DS is not detected. On the other hand, if the sensor controller 2 determines that the downlink signal DS is detected, the sensor controller 2 derives the position on the basis of the result of the local scan and overwrites the position stored in the memory 11, with the position (step S8). The details of the derivation are also as described above. Here, the peak may not be detected in the distribution of reception levels of the downlink signal DS depending on the position. In such as a case, the sensor controller 2 executes a process of deleting the corresponding position from the memory 11.

Next, the sensor controller 2 receives the data signal at each position stored in the memory 11 (step S9). Specifically, the sensor controller 2 acquires the symbol sequences output from each reception unit 12-k illustrated in FIG. 8. The sensor controller 2 then determines the phase for each of the received data signals (symbol sequences) (step S10, determination step). As described above, in the determination, the sensor controller 2 attempts to detect the preamble and the inverted preamble in the symbol sequences output from each reception unit 12-k. When the preamble is detected, the sensor controller 2 determines that the phase of the downlink signal DS matches the phase shared in advance between the sensor controller 2 and the active pen PE. On the other hand, when the inverted preamble is detected, the sensor controller 2 determines that the phase of the downlink signal DS does not match (inverted) the phase shared in advance between the sensor controller 2 and the active pen PE.

Subsequently, the sensor controller 2 acquires the transmission data of the active pen PE on the basis of the data signal for which the sensor controller 2 has determined that the phase of the downlink signal DS matches in step S10 (step 511), and outputs the transmission data to the host processor 3 along with the position stored in the memory 11, in association with the data signal (step S12, output step). The other positions stored in the memory 11 are not output. In this way, only the position derived on the basis of the downlink signal DS with the phase matching the phase shared in advance between the sensor controller 2 and the active pen PE and the data acquired on the basis of the downlink signal DS are output to the host processor 3. The sensor controller 2 then returns to step S6 to continue the process.

As described above, according to the method of palm rejection executed by the sensor controller 2 of the present embodiment, the phase of the downlink signal DS is determined in step S10, and the position derived on the basis of the downlink signal DS detected through the human body can be discerned. Therefore, the contact position of the palm PA can be excluded from the instruction position of the active pen PE, without relying on a result of a detection process, such as a touch detection process, different from the detection process of detecting the active pen PE.

Although the preferred embodiment of the present disclosure has been described, the present disclosure is not limited to the embodiment, and various modification are possible as will be apparent to those skilled in the art.

For example, although the MCU 10 executes the process of attempting to detect the preamble and the inverted preamble in the symbol sequences output from each reception unit 12-$k$ in the example described in the embodiment, the process need not be executed when the sensor controller 2 and the active pen PE perform two-way communication. That is, when the sensor controller 2 and the active pen PE perform two-way communication, the sensor controller 2 in the operation mode is in synchronization with the active pen PE. Therefore, the timing at which the preamble is included in the downlink signal DS can be known in advance, and therefore it is possible to determine the phase of the downlink signal DS by determining which one of the preamble or the inverted preamble is output from each reception unit 12-$k$ at that timing.

Although the phase of the downlink signal DS is determined on the basis of the phase of the preamble in the example described in the embodiment, data other than the preamble can similarly be used to determine the phase of the downlink signal DS, as long as the data is predetermined data shared in advance between the sensor controller 2 and the active pen PE. For example, when the data signal includes a start bit and a stop bit, the phase of the downlink signal DS may be determined on the basis of the phase of one or both of these bits.

Further, in a case where the data signal includes data for error detection, a case in which errors are continuously detected can be treated as a case in which the phase of the downlink signal DS is inverted. Further, in a case where an error is detected, the chip sequences output from the demodulation unit 33 may be inverted and input again to the correlation calculation unit 34 to acquire the symbol sequences again. When the preamble is included in the acquired symbol sequences, it may be determined that the phase of the downlink signal DS is inverted.

Although the plurality of reception units 12-1 to 12-$n$ are provided in the sensor controller 2 in the example described in the embodiment, only one reception unit may be provided. In this case, the phase of the downlink signal DS cannot be determined in parallel at a plurality of positions. However, at least which one of the pen tip electrode 21 or the palm PA has transmitted the received downlink signal DS can be determined.

The various embodiments described above can be combined to provide further embodiments. Aspects of the embodiments can be modified to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of palm rejection executed by a sensor controller that is connected to a plurality of sensor electrodes and that detects a downlink signal transmitted from an active pen, the method comprising:
   determining whether or not a phase of the detected downlink signal matches a phase shared in advance between the sensor controller and the active pen; and
   outputting, responsive to a determination that the phases match, a position of the active pen derived on a basis of a distribution of levels of the downlink signal in the plurality of sensor electrodes.

2. The method according to claim 1, wherein, in the outputting, the position of the active pen derived on the basis of the distribution of levels of the downlink signal in the plurality of sensor electrodes is not output responsive to a determination that the phases do not match.

3. The method according to claim 1, wherein
   the active pen transmits the downlink signal that includes a predetermined waveform portion shared in advance between the sensor controller and the active pen, and
   in the determining, whether or not the phase of the downlink signal matches the phase shared in advance between the sensor controller and the active pen is determined on a basis of a phase of the predetermined waveform portion included in the downlink signal.

4. The method according to claim 3, wherein the predetermined waveform portion is a portion obtained by modulating predetermined data shared in advance between the sensor controller and the active pen.

5. The method according to claim 4, wherein the predetermined data is any one of a preamble, a start bit, or a stop bit.

6. The method according to claim 4, wherein,
   when the predetermined data is included in a symbol sequence obtained by demodulating the downlink signal, it is determined that the phase of the detected downlink signal matches the phase shared in advance between the sensor controller and the active pen, and
   when said symbol sequence includes inverted data that is a part corresponding to the predetermined data in the symbol sequence obtained by demodulating the downlink signal, it is determined that the phase of the detected downlink signal does not match the phase shared in advance between the sensor controller and the active pen.

7. The method according to claim 6, wherein
   the sensor controller and the active pen are configured to be able to perform two-way communication in synchronization with each other, and
   in the determining, a process of determining whether or not the predetermined data or the inverted data is included in the symbol sequence obtained by demodulating the downlink signal is executed at a timing in which the predetermined data is included in the downlink signal.

8. A sensor controller that is connected to a plurality of sensor electrodes and that detects a downlink signal having a predetermined frequency or a predetermined waveform transmitted from an active pen, wherein the sensor controller comprises:
- a memory; and
- a one or more processors coupled to the memory and configured to:
- determine whether or not a phase of the detected downlink signal matches a phase shared in advance between the sensor controller and the active pen, and
- output, responsive to a determination that the phases match, a position of the active pen derived on a basis of a distribution of levels of the downlink signal in the plurality of sensor electrodes.

9. The sensor controller according to claim 8, wherein the one or more processors are configured to not output, responsive to a determination that the phases do not match, the position of the active pen derived on the basis of the distribution of levels of the downlink signal in the plurality of sensor electrodes.

10. The sensor controller according to claim 8, wherein
- the downlink signal transmitted from the active pen includes a predetermined waveform portion shared in advance between the sensor controller and the active pen, and
- the one or more processors are configured to determine whether or not the phase of the downlink signal matches the phase shared in advance between the sensor controller and the active pen on a basis of a phase of the predetermined waveform portion included in the downlink signal.

11. The sensor controller according to claim 10, wherein the predetermined waveform portion is a portion resulting from the active pen modulating predetermined data shared in advance between the sensor controller and the active pen.

12. The sensor controller according to claim 11, wherein the predetermined data is any one of a preamble, a start bit, or a stop bit.

13. The sensor controller according to claim 11, wherein the one or more processors are configured to determine:
- the phase of the detected downlink signal matches the phase shared in advance between the sensor controller and the active pen, responsive to a determination that the predetermined data is included in a symbol sequence obtained by demodulating the downlink signal, and
- the phase of the detected downlink signal does not match the phase shared in advance between the sensor controller and the active pen, responsive to a determination that said symbol sequence includes inverted data that is a part corresponding to the predetermined data in the symbol sequence obtained by demodulating the downlink signal.

14. The sensor controller according to claim 13, wherein
- the sensor controller is configured to be able to perform two-way communication in synchronization with the active pen, and
- the one or more processors are configured to execute a process of determining whether or not the predetermined data or the inverted data is included in the symbol sequence obtained by demodulating the downlink signal at a timing in which the predetermined data is included in the downlink signal.

* * * * *